United States Patent [19]

Blakely

[11] 4,428,420
[45] Jan. 31, 1984

[54] HEAT ABSORBING ELEMENT AND METHOD OF MANUFACTURE

[76] Inventor: Stephen W. Blakely, Apt. A, 503 Beacon, Alton, Ill. 62002

[21] Appl. No.: 283,989

[22] Filed: Jul. 16, 1981

[51] Int. Cl.³ ............................................. F28F 1/14
[52] U.S. Cl. ............................. 165/183; 29/157.3 A; 126/446; 138/143; 138/152; 228/150; 228/173 C; 228/183
[58] Field of Search ........................ 126/446, 447, 448; 165/171, 183; 29/157.3 R, 157.3 A; 228/144, 149, 150, 173 C, 183; 138/143, 151, 152

[56] References Cited

U.S. PATENT DOCUMENTS

| | | | |
|---|---|---|---|
| 2,203,006 | 6/1940 | Young | 138/151 |
| 3,311,134 | 3/1967 | Howard | 138/152 |
| 3,464,402 | 9/1969 | Collura | 165/171 |
| 3,521,587 | 7/1970 | Habdos | 29/157.3 A |
| 4,011,856 | 3/1977 | Gallagher | 126/446 |
| 4,227,511 | 10/1980 | Margen et al. | 126/415 |
| 4,237,971 | 12/1980 | Olsson et al. | 165/171 |

FOREIGN PATENT DOCUMENTS 891592 3/1944 France .............................. 165/171

*Primary Examiner*—Lee E. Barrett
*Attorney, Agent, or Firm*—Senniger, Powers, Leavitt and Roedel

[57] ABSTRACT

A heat absorbing element formed from a single metal strip of substantially uniform thickness, comprising a tube having a wall comprising at least a double thickness of strip seamed along a line extending longitudinally of the tube to seal the tube for flow therethrough of a heat transfer fluid, and a fin along the tube stretching out from the seam line, the fin comprising at least one less thickness of strip than the tube wall. A method of manufacturing such an element is also disclosed.

8 Claims, 9 Drawing Figures

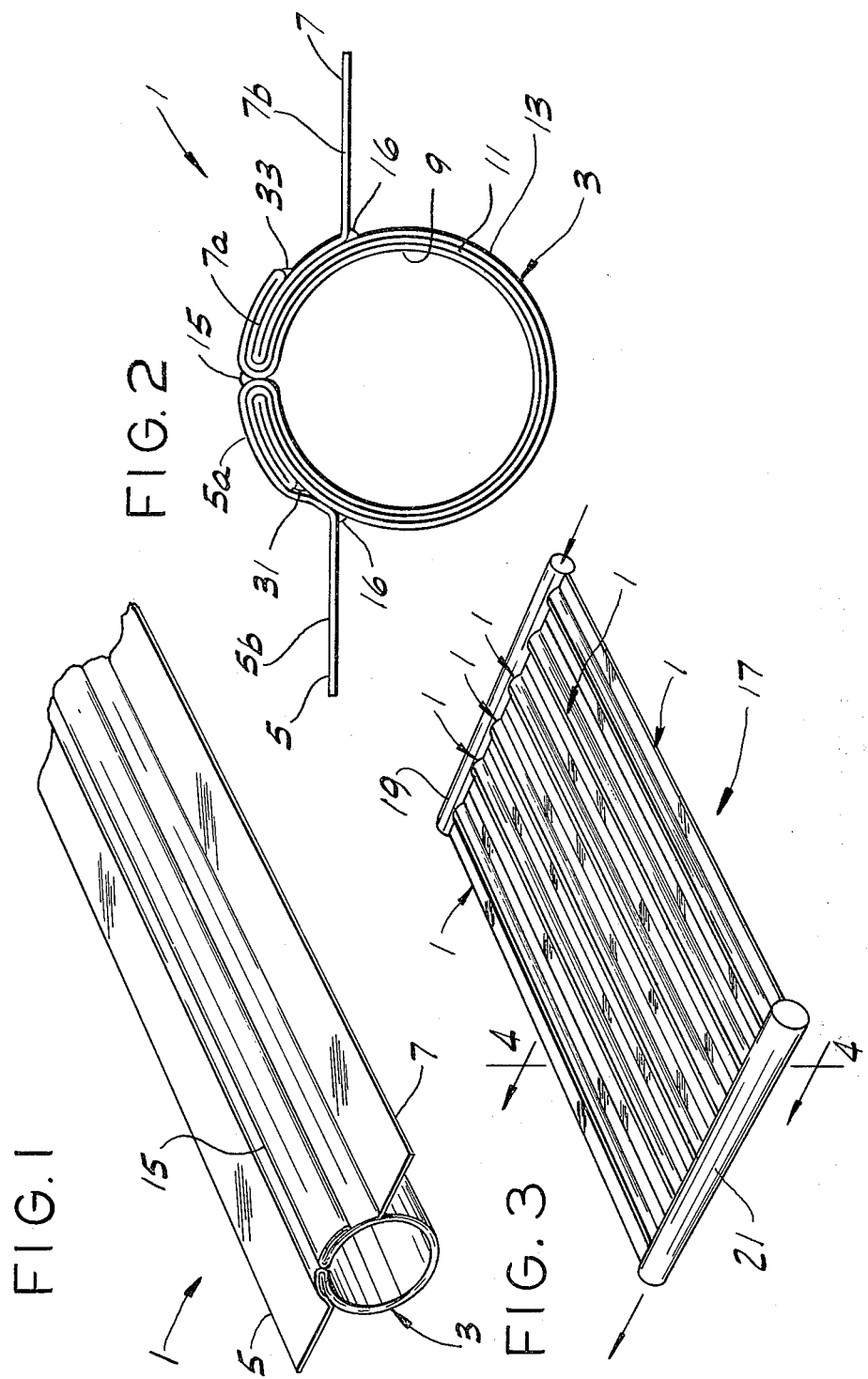

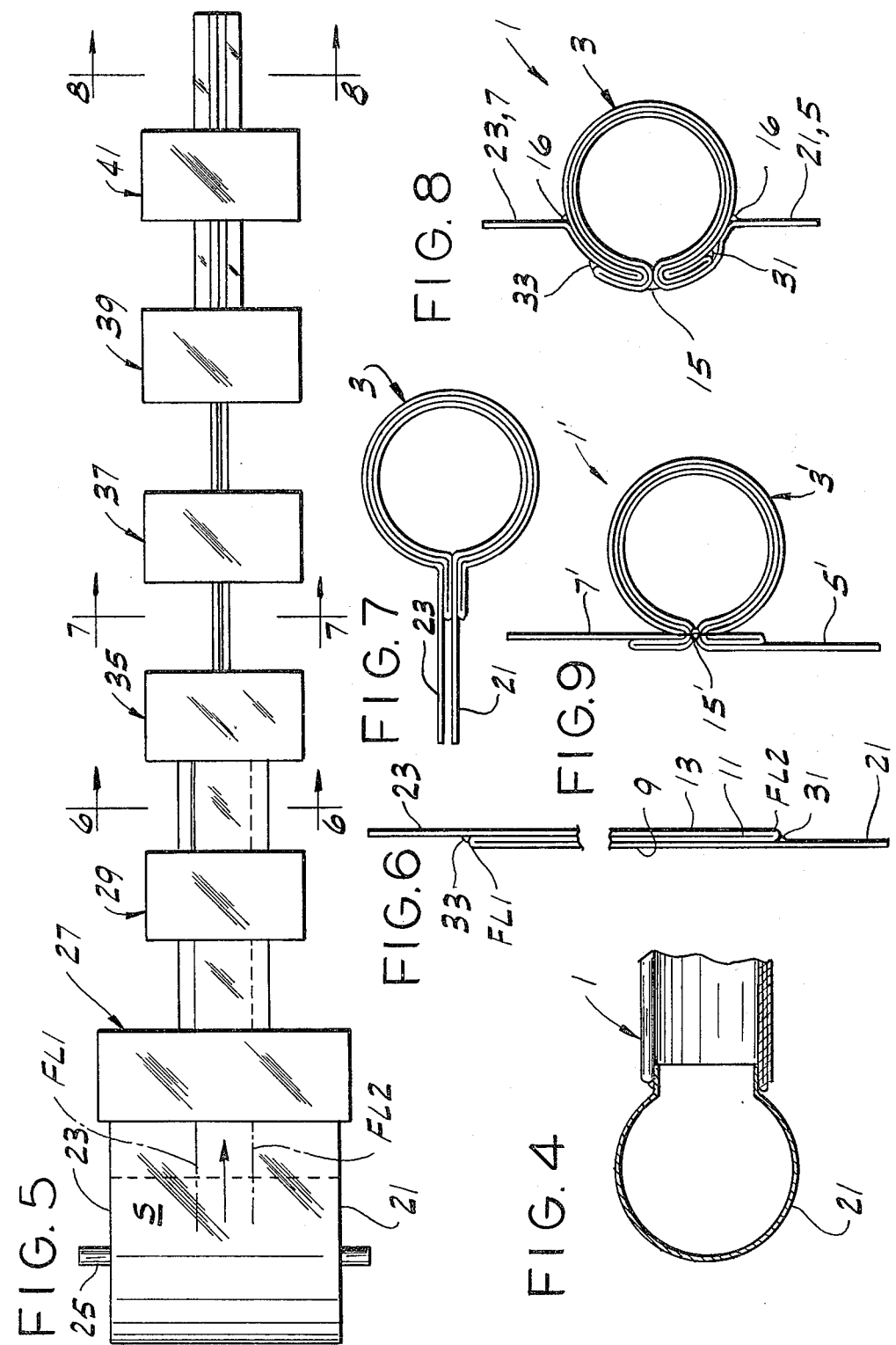

HEAT ABSORBING ELEMENT AND METHOD OF MANUFACTURE

BACKGROUND OF THE INVENTION

The present invention relates generally to a heat absorbing device and, more particularly, to a heat absorbing element or plate useful in solar collectors.

This invention is especially concerned with heat absorbing elements of the tube-and-fin type where solar radiation incident on the fins is converted into heat energy and conducted by the fins to a tube or tubes containing a suitable heat transfer fluid. To withstand operating fluid pressure and temperature conditions, and to meet various code requirements, the wall thickness of the tube(s) must be rather generous (e.g., 0.020"). The thickness of the fins, on the other hand, need not be as great (e.g., 0.005").

Heretofore, heat absorbing elements of the tube-and-fin type have been produced in many ways, such as by extrusion. In this process, however, the fins and tubes are typically extruded to the same thickness, that is, to the thickness required for the tube walls. Thus the fins are excessively thick and an unnecessary amount of material (e.g., aluminum) is consumed which results in higher manufacturing costs. Absorbers have also been made by bonding tubes (e.g., copper or aluminum tubes) directly to metal sheets (e.g., aluminum sheets). In this process, the thicknesses of the tube walls and fins can be controlled, but bonding the tubes to the sheets raises other problems.

Reference may be made to U.S. Pat. Nos. 4,237,971, 4,227,511 and 4,011,856 for a description of various solar heating devices generally in the field of this invention.

SUMMARY OF THE INVENTION

Among the several objects of this invention may be noted the provision of an improved heat absorbing element of the tube-and-fin type wherein the thickness of the fins is considerably less than the wall thickness of the tubes for economical manufacture; the provision of such an absorbing element having superior thermal performance characteristics; the provision of such an absorber element which can readily be assembled with other absorber elements of the same type to produce an absorption unit; the provision of a novel method for producing such an absorber element from a single continuous strip of suitable metal (e.g., copper) for maximizing thermal efficiency of the element; and the provision of such a method whereby absorbing elements are produced in a continuous process at relatively high speed for reducing manufacturing costs.

In general, a heat absorbing element of the present invention is made from a single metal strip of substantially uniform thickness and comprises a tube having a wall comprising at least a double thickness of strip seamed along a line extending longitudinally of the tube to seal the tube for flow therethrough of a heat transfer fluid, and a fin along the tube stretching out from the seam of the tube for collecting heat and transferring it to the tube, the fin comprising at least one less thickness of strip than the tube wall.

The method of the present invention for manufacturing the aforementioned absorbing element comprises feeding a continuous metal strip of substantially uniform thickness forwardly in the direction of its length, folding the strip as it is fed forward on at least one fold line extending longitudinally of the strip to form at least a double thickness of strip, forming the multiple thickness of strip into a tube extending longitudinally of the strip, and seaming the tube closed along a line extending longitudinally of the tube, the longitudinal edge margins of the strip extending outwardly away from the seam and forming a pair of fins along the tube.

Other objects and features will be in part apparent and in part pointed out hereinafter.

BRIEF DESCRIPTION OF THE DRAWINGS

FIG. 1 is a perspective of a heat absorbing element of the present invention;

FIG. 2 is an enlarged end elevation of FIG. 1;

FIG. 3 is a perspective of a solar collector comprising a series of heat absorbing elements disposed side-by-side;

FIG. 4 is an enlarged vertical section on line 4—4 of FIG. 3;

FIG. 5 is a diagrammatic plan view illustrating the manufacture of heat absorber elements in accordance with a method of this invention;

FIG. 6 is a section on line 6—6 of FIG. 5;

FIG. 7 is a section on line 7—7 of FIG. 5;

FIG. 8 is a section on line 8—8 of FIG. 5; and

FIG. 9 is a view similar to FIG. 2 showing a heat absorber element of alternate design.

Corresponding reference characters indicate corresponding parts throughout the several views of the drawings.

DESCRIPTION OF THE PREFERRED EMBODIMENT

Referring now to the drawings, first more particularly to FIGS. 1 and 2, an elongate heat absorbing element of the present invention, designated in its entirety by the reference numeral 1, is shown as comprising a tube 3 for flow therethrough of a suitable heat transfer fluid (e.g., water), and a pair of fins extending along (i.e., axially with respect to) the tube at opposite sides of the tube, the left fin (as viewed in FIGS. 1 and 2) being designated 5 and the right fin 7. These fins 5, 7 serve to collect heat generated by incident solar radiant energy, for example, and to transfer the heat to the tube 3 and fluid therein. In accordance with this invention, the element is formed from a single strip of metal having suitable strength and thermal characteristics (e.g., aluminum, copper or a copper alloy) and a thickness corresponding to the fin thickness necessary for optimum thermal efficiency. For example, for copper or aluminum, the thickness of the fins 5, 7 (and thus the thickness of the metal strip from which the element is formed) may be about 5 mils (0.005 in.).

As illustrated in FIG. 2, the tube 3 is circular in cross section and its wall comprises three thicknesses of metal strip, viz., an inner thickness or ply 9, a middle ply 11, and an outer ply 13. Assuming that each ply is 5 mils thick, the overall wall caliper is approximately 15 mils (0.015 in.), which should be sufficient in most situations. However, more extreme operating pressure and temperature conditions may require a greater number of plies (e.g., 5, 7 or 9 plies). Under less extreme conditions, two plies may be sufficient. The tube 3 is seamed (as by induction welding) along a line of seam 15 extending longitudinally of the tube to seal the tube. The fins 5, 7 stretch out in opposite directions from this seam line 15.

As shown in FIG. 2, the left fin 5, which comprises one longitudinal edge margin of the metal strip from which the element 1 is formed, has an inner portion 5a adjacent the seam line 15 bent into thermal contact with the outer surface of the tube at the left side of the seam line, and an outer portion 5b extending laterally (horizontally) outwardly away from the tube 3 at its left side. Similarly, the right fin 7, which comprises the other longitudinal edge margin of the strip from which the element is formed, has an inner portion 7a adjacent the seam line 15 bent into thermal contact with the outer surface of the tube at the right side of the seam line, and an outer portion 7b extending laterally (horizontally) outwardly away from the tube 3 at its right side, the outer sections 5b, 7b of the two fins being generally coplanar and lying in a plane extending generally axially with respect to the tube. As indicated at 16, the inner portions 5a, 7a of the two fins are preferably bonded (e.g., by solder of thermal adhesive) to the surface of the tube 3 to enhance the conductance of heat from the fins to the tube and thus to the heat transfer fluid therein. The fins may be coated with a nonreflective radiation-absorbent coating (e.g., a black oxide coating).

To increase the thermal conductivity characteristics of the absorbing element 1 and to provide greater tube wall strength for resisting fluid pressure, the plies 9, 11 and 13 of the tube are preferably bonded together, as described in more detail hereinbelow. While the wall of the tube 3 described herein comprises three thicknesses or plies 9, 11 and 13 of metal strip, it will be understood that this number may vary, depending on the operating fluid temperatures and pressure conditions.

Indicated generally at 17 in FIG. 3 is a solar collector panel constructed of a series of absorbing elements 1 disposed side-by-side and connected at their ends to an inlet header 19 for flow of unheated heat transfer fluid into the absorbing elements and an outlet header 21 for flow of heated fluid out of the elements. The absorbing elements are connected to the headers in conventional fashion, as illustrated in FIG. 4.

FIGS. 5–8 illustrate a method of manufacturing heat absorbing elements 1 from a single metal strip. As shown, a continuous strip S of suitable metal (e.g., copper, a copper alloy, aluminum or stainless steel) of substantially uniform thickness (e.g., 0.005 in.) having longitudinal edges 21, 23 is unwound from a takeoff reel 25 and fed forwardly (from left to right as viewed in FIG. 5) in the direction of its length to a folding station 27. At this station suitable tooling folds the strip S as it is fed forward on a first fold line FL1 extending longitudinally of the strip to form a double thickness of strip and then on a second fold line FL2 extending longitudinally of the strip and spaced transversely from the first fold line FL1 to form a triple thickness of strip, the folded strip being generally Z-shaped in transverse section with the longitudinal edge margins of the strip extending laterally outwardly beyond the fold lines FL1 and FL2 (see FIG. 6). After being folded, the strip S is fed to a station 29 where the fold corresponding to the inner ply 9 of the finished tube 3 is bonded (as indicated at 31 in FIG. 6) to the fold corresponding to middle ply 11. This latter ply 11 is also bonded, as indicated at 33, to the fold corresponding to the outer ply 13 of the tube 3.

The folded strip S is fed forward (toward the right) from station 29 to a tube-forming station 35 where the strip S is roll formed by suitable means to form tube 3, as shown in FIG. 7. The tube is then seamed closed (by means of an induction welder, for example) along seam line 15 at a section 37 downstream from the tube-forming station 35. Following this seaming operation, the strip is fed forwardly to a station 39 where the longitudinal edge margins of the strip S, forming the fins 5 and 7, are bent down to the position shown in FIG. 8, with the inner portions 5a, 7a of the fins conforming to the outer surface of the tube 3 on opposite sides of the seam line 15 and with the outer portions 5b, 7b of the fin extending laterally outwardly away from the tube at opposite sides thereof. From station 39, the strip is fed to a station 41 where the inner portions 5a, 7a of the fins are bonded (e.g., soldered) to the outer surface of the tube, as indicated at 16. The final step of the process (not illustrated in the drawings) is to sever the continuous absorber strip into individual elements 1 of desired length.

A heat absorbing element of alternate design is shown in FIG. 9 and generally designated 1'. This absorbing element is identical to the element 1 described hereinabove except that the inner portion of the fins 5', 7' are not bent into intimate thermal contact with the outside of the tube 3'. Instead, the fins extend straight out (i.e., generally horizontally) in opposite directions from the seam 15', which may be made by induction welding, for example. In this embodiment, bonds 16, 31 and 33 of the first embodiment are eliminated, being replaced by the single bond 15'. The heat absorbing element 1' may be produced in the same manner as element 1, except that at station 39 the fins are folded into the FIG. 9 configuration, and station 41 is obviated.

The heat absorbing element 1 of this invention has superior thermal performance characteristics inasmuch as it is formed from a single piece of metal. It is also economical to manufacture since there is no wastage of metal in the fin area. The fact that the elements can be made by a continuous manufacturing process (rather than a batch process, for example) also reduces production costs.

In view of the above, it will be seen that the several objects of the invention are achieved and other advantageous results attained.

As various change could be made in the above constructions without deparing from the scope of the invention, it is intended that all matter contained in the above description or shown in the accompanying drawings shall be interpreted as illustrative and not in a limiting sense.

What is claimed is:

1. A heat absorbing element formed from a single metal strip of substantially uniform thickness, said strip having longitudinal edge margins at opposite sides of the strip, said element comprising a tube having a wall comprising at least a double thickness of said strip seamed along a line extending longitudinally of the tube to seal the tube for flow therethrough of heat transfer fluid, and a pair of fins formed by said longitudinal edge margins extending generally axially with respect to the tube stretching out from said line of seam for collecting heat and transferring it to the tube, each axial fin comprising at least one less thickness of said strip than the tube wall.

2. A heat absorbing element as set forth in claim 1 wherein the wall of said tube comprises a triple thickness of said strip.

3. A heat absorbing element as set forth in claim 1 wherein each fin comprises a single thickness of said strip.

4. A heat absorbing element as set forth in claim 1 wherein each fin comprises an inner portion adjacent said line of seam bent into thermal contact with the outer surface of the tube at one side of the line of seam, and an outer portion extending laterally outwardly away from the tube at one side thereof, said outer portion lying in a plane extending generally axially with respect to the tube.

5. A heat absorbing element as set forth in claim 4 wherein said inner portion of the fin is bonded to the outer surface of the tube.

6. A heat absorbing element as set forth in claim 4 wherein the outer portions of said fins are generally coplanar.

7. A heat absorbing element as set forth in claim 1 wherein the two thicknesses of said strip comprising the wall of the tube are bonded together.

8. A heat absorbing element as set forth in claim 7 wherein the wall of said tube comprises three thicknesses of said metal strip bonded together.

* * * * *